United States Patent
Houlding

(10) Patent No.: US 6,735,771 B1
(45) Date of Patent: May 11, 2004

(54) SYSTEM AND METHOD FOR DELIVERING WEB SERVICES USING COMMON OBJECT REQUEST BROKER ARCHITECTURE

(75) Inventor: David Ian Houlding, Palm Harbor, FL (US)

(73) Assignee: Perot Systems Corporation, Plano, TX (US)

( * ) Notice: Subject to any disclaimer, the term of this patent is extended or adjusted under 35 U.S.C. 154(b) by 0 days.

(21) Appl. No.: 09/267,526

(22) Filed: Mar. 12, 1999

(51) Int. Cl.[7] .................................................. G06F 9/44
(52) U.S. Cl. .......................................... 719/315; 719/316
(58) Field of Search .................................. 709/315, 332, 709/316, 201; 719/315, 316, 332

(56) References Cited

U.S. PATENT DOCUMENTS

| | | | | |
|---|---|---|---|---|
| 5,978,568 A | * | 11/1999 | Abraham et al. | 395/200.54 |
| 5,983,233 A | * | 11/1999 | Potonniee | 707/103 |
| 6,260,078 B1 | * | 7/2001 | Fowlow | 709/332 |
| 6,279,030 B1 | * | 8/2001 | Britton et al. | 709/203 |
| 6,347,342 B1 | * | 2/2002 | Marcos et al. | 709/315 |
| 6,374,308 B1 | * | 4/2002 | Kempf et al. | 709/316 |
| 6,385,661 B1 | * | 5/2002 | Guthrie et al. | 709/316 |
| 6,397,191 B1 | * | 5/2002 | Notani et al. | 705/9 |

* cited by examiner

Primary Examiner—Meng-Al T. An
Assistant Examiner—The Thanh Ho
(74) Attorney, Agent, or Firm—Jenkens & Gilchrist, P.C.

(57) ABSTRACT

A system and method that facilitates the development of client applications that wish to request services provided by a Common Object Request Broker Architecture (CORBA) object is presented. Using this system and method, application developers that are developing client applications may, with a familiar web browser, browse and discover currently available CORBA objects registered with the CORBA Naming Service. Similarly for each CORBA object application developers may browse and discover the services provided by that CORBA object as defined by its Interface Definition Language (IDL) interface retrieved from the CORBA Interface Repository. Finally to develop a client application that requests a particular service of a particular CORBA object the application developer may select that service in the web browser view and download an associated proxy that may be quickly and easily integrated with the client application allowing the application developer to develop client applications that use more than one service provided by one or more CORBA objects.

29 Claims, 3 Drawing Sheets

SYSTEM AND METHOD FOR DELIVERING WEB SERVICES USING COMMON OBJECT REQUEST BROKER ARCHITECTURE

BACKGROUND OF THE INVENTION

1. Technical Field of the Invention

The present invention is related to distributed computing and, more particularly, to distributed object systems.

2. Description of Related Art

Advances in computers systems have greatly simplified the task of information processing. Computer systems can typically store large amounts of information in a relatively small area of physical space and permit the information stored to be easily accessed and modified. Computer systems also allow large amounts of information to be processed both quickly and accurately.

Computer systems are sometimes operated as stand-alone devices or connected together by way of a communications medium, typically together with a server, to form a computer network. A server is a class of computers used to handle file, print, and certain application services which are common to all the connected computers, known as clients. The largest, and most popular computer network is known as the Internet. When networked together, computers can communicate information and perform processing functions. The foregoing is known as distributed computing.

Distributed computing is further facilitated by object-oriented programming. Object-oriented programming is a form of software development that models the real world through representation of objects or modules that contain data as well as instructions that work upon that data. The objects encapsulate the attributes, relationships, and methods of software-identifiable program components simplifying complex programs. Accordingly, the attributes, relationships, and methods of an object can be written, compiled, tested, and deployed independently of one another. Additionally, the different objects can be implemented in different programming languages, reside on different computers, and even different platforms in different operating system environments. A system with objects residing on different platforms is known as a distributed object system.

Distributed object systems facilitate application program development by permitting object services to be made available (published) to application programmers. Instead of requiring the application program to have each function and data of the application program performed within the application program, the application program can access certain objects performing certain functions outside the application program. In the foregoing scenario, the accessing application program is referred to as a client application and the object is referred to as a server object. However, use of a distributed object system requires the establishment of a communications standard as well as attention to various low-level networking issues. The communications and low-level networking standards, as well as many architectural and implementation features, are currently provided for by a de facto standard middleware for distributed object systems known as the Common Object Request Broker Architecture (CORBA).

In the CORBA paradigm, a client application wishing to perform an operation on a server object sends a request. The request is received by an Object Request Broker (ORB). The ORB is responsible for all of the mechanisms required to find the object implementation for the request, to prepare the object implementation to receive the request, and to communicate the data making up the request to the server object. A server object accessible by CORBA is referred to as a CORBA object. The client can make a request using either static invocation or dynamic invocation.

Static invocation is the standard approach for clients to interact with CORBA objects. However, it requires the CORBA client to use, and therefore, be in the possession of code stubs associated with the CORBA object. This requirement is undesirable in cases where the CORBA object stubs are not freely published, where clients talk to a large variety of CORBA objects, or where CORBA object interfaces change frequently.

Dynamic invocation addresses this problem by allowing clients to form and execute requests on CORBA servers on the fly, i.e., dynamically, without having to first acquire any code stubs. However, the power that CORBA and dynamic invocation offers the user comes at a price, namely, increased complexity, resulting in slower adoption by industry, particularly in view of the requisite increase in training and implementation costs and delays.

In order for a CORBA object to receive requests from client applications, the CORBA object interface must first be defined in the CORBA Interface Definition Language (IDL). This IDL interface defines the services that the CORBA server object provides, as well as, for each service, the number and type of associated arguments, return values, and any potential exceptions which may be generated. The CORBA Interface Repository is a standard CORBA server object that is responsible for storing and automatically disseminating the IDL interface of CORBA server objects to client applications. Before client applications may request a given service of CORBA objects, as defined by the respective IDL interface, that client application must first locate that CORBA object on the network. The CORBA Naming Service is a standard CORBA server object on the network responsible for facilitating CORBA object location. Currently available CORBA server objects may register themselves with the CORBA Naming Service. Client applications may then use the CORBA Naming Service to look-up particular CORBA objects from which to request a service. A well established design pattern used in the development of distributed object systems involves the use of a helper object, commonly known as a proxy, that assists a client application in communicating with a given CORBA object.

In view of the above, it should be understood that the delivery of CORBA object services requires a considerable degree of CORBA expertise by the application developer. On a separate technological path, world wide web-based information systems have achieved phenomenal success, largely because of the web's high accessibility and ease of use. Therefore, it would be advantageous if the power of a distributed object system, such as used in CORBA-based systems, could be leveraged with the ease and accessibility of web services.

Accordingly, it is an object of the present invention to leverage the power of a distributed object system with the ease and accessibility of web services.

It is also an object of the present invention to decouple application development and server development, allowing organizations and individuals to better focus limited and expensive distributed object systems server development expertise on the development and publication of web services rather than complicated protocols, such as in CORBA.

It is a further object of the present invention to encapsulate the implementation complexity of a CORBA Dynamic Invocation Interface.

SUMMARY OF THE INVENTION

The present invention is directed to a system and method for receiving services from a server object through a web browser. The web browser is used to search a server object library by accessing a servlet engine. The servlet engine retrieves the elements stored in the library, formats the elements into a format compatible with the web browser, and transmits the elements to the web browser.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF PREFERRED EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
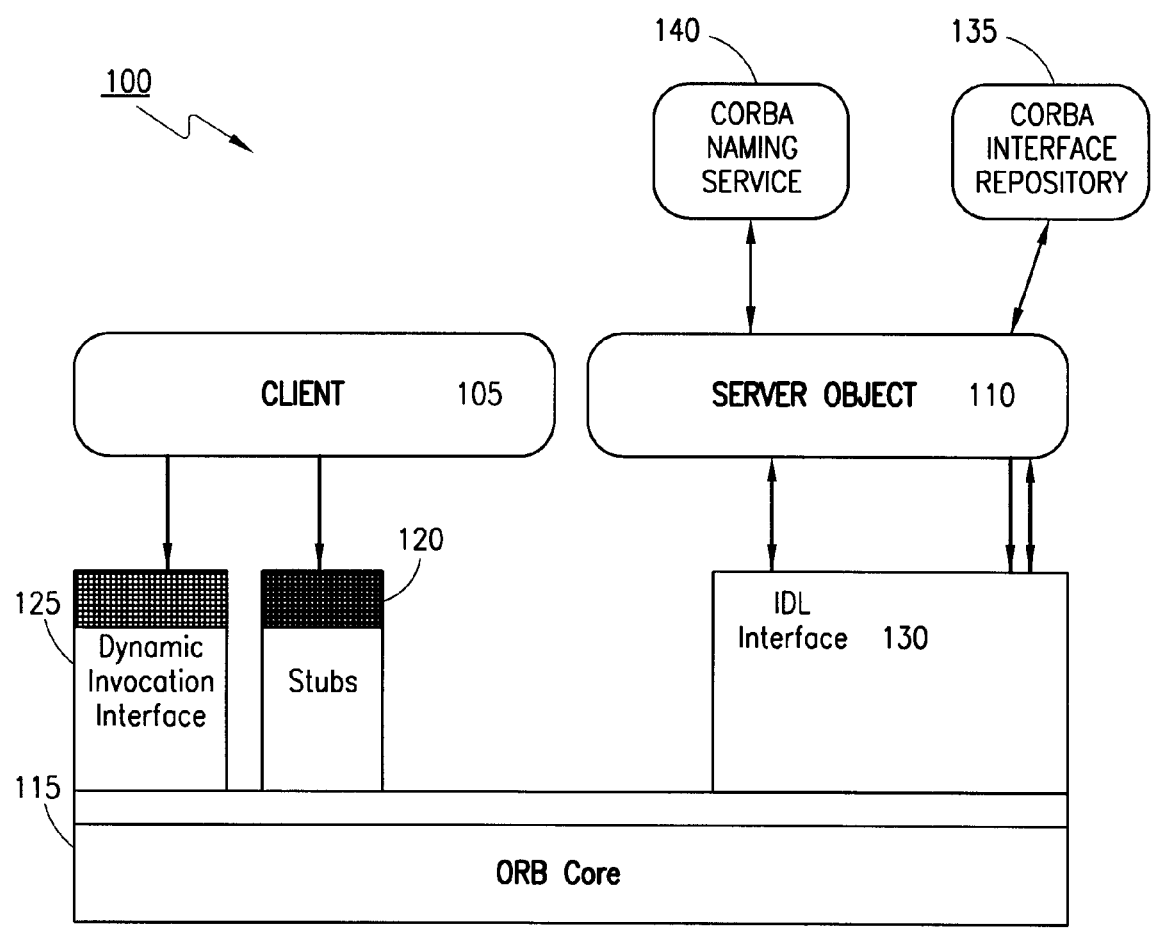
FIG. 1 is an exemplary distributed object system wherein the present invention can be practiced.

Referring now to FIG. 1, there is illustrated an exemplary distributed object system, generally designated by the reference numeral 100, wherein the present invention can be practiced. As shown in the figure, a distributed object system includes a client application 105 that requests and accesses services from a server object 110 via mechanisms described in more detail hereinbelow. It should be understood, of course, that in a distributed environment, such as the web or any distributed system, the client application 105 and the server object 110 can reside on either the same computer or different computers. In the case where the objects reside on different computers, the computers are connected via a communications medium, such as the Internet.

A goal of distributed object systems is that the objects seamlessly communicate with each other as if they resided on a single computer in a homogenous computing environment. However, because the client application 105 and the server object 110 may reside on different computers in a heterogenous computing environment, a communications protocol as well as low-level networking standards are required. The foregoing is provided by the aforementioned de facto standard middleware known as the Common Object Request Broker Architecture (CORBA).

In accordance with CORBA, a client application, such as client application 105, wishing to perform an operation on a server object 110, known in this example as a CORBA object 110, sends a request. The request is forwarded to an Object Request Broker (ORB) 115. The ORB 115 serves as a communication layer and is responsible for finding the particular CORBA object 110 corresponding to the request, to preparing that CORBA object 110 to receive the request, and forwarding the data making up the request. To effectuate the communication layer functionality, the ORB 115 uses an Internet Inter-ORB Protocol (IIOP). With reference again to FIG. 1, client application 105 makes the request to the CORBA object 110 using either static invocation via code stubs 120 or dynamic invocation via a Dynamic Invocation Interface 125.

Static invocation is the standard approach for client applications 105 to interact with CORBA objects 110. However, static invocation requires the client application 105 to use, and therefore, be in the possession of the requisite code stubs 120 associated with the pertinent CORBA object 110. This requirement, however, is undesirable in several situations, e.g., cases where the code stubs 120 are not freely published, where the client application 105 communicates with a large variety of CORBA objects 110, or where the server code stubs 120 change frequently.

Dynamic invocation provides more flexibility to overcome the disadvantages of the static approach, i.e., the client application 105 can use instead a Dynamic Invocation Interface (DII) 125. As discussed, the DII allows client applications 105 to form and execute requests on CORBA objects 110 dynamically without having to first acquire any code stubs 120. However, the usage of a DII 125 brings increased complexity and requires the user to be familiar with the intricate details of CORBA.

From the perspective of the CORBA object 110, in order for the CORBA 110 object to communicate with the outside world, an Interface Definition Language (IDL) interface 130, e.g., between the CORBA object 110 and the ORB 115, is needed so that the aforementioned client applications 105 can find messages to send in order to invoke the protocols and methodology of that particular CORBA object 110. The IDL interface 130 is preferably written in an Interface Definition Language (IDL) and describes the number and type of arguments the CORBA object 110 requires, the values returned, and any possible exception conditions. The various IDL interfaces 130 of the different CORBA objects 110 are disseminated by a CORBA Interface Repository 135 which allows client applications 105 to determine the particular IDL interface 130 corresponding to a given CORBA object 110. CORBA also includes a CORBA Naming Service 140 which provides services for a tree-based look-up of the various CORBA objects 110, only one of which is shown for convenience of illustration in FIG. 1, allowing client applications 105 to locate specified CORBA objects 110 in communication with the ORB 115.

As noted hereinabove, the power of CORBA comes at the price of increased user complexity, which must be assimilated by new users and organizations before the full benefits of the CORBA paradigm can be realized. Application developers, in particular, must possess a considerable degree of CORBA expertise to adequately exploit this technology. In an effort to alleviate the steep learning curve and skill requirements due to this complexity, the present invention proposes leveraging the power and flexibility of the CORBA paradigm with the ease and accessibility of web services.

Figure 2:
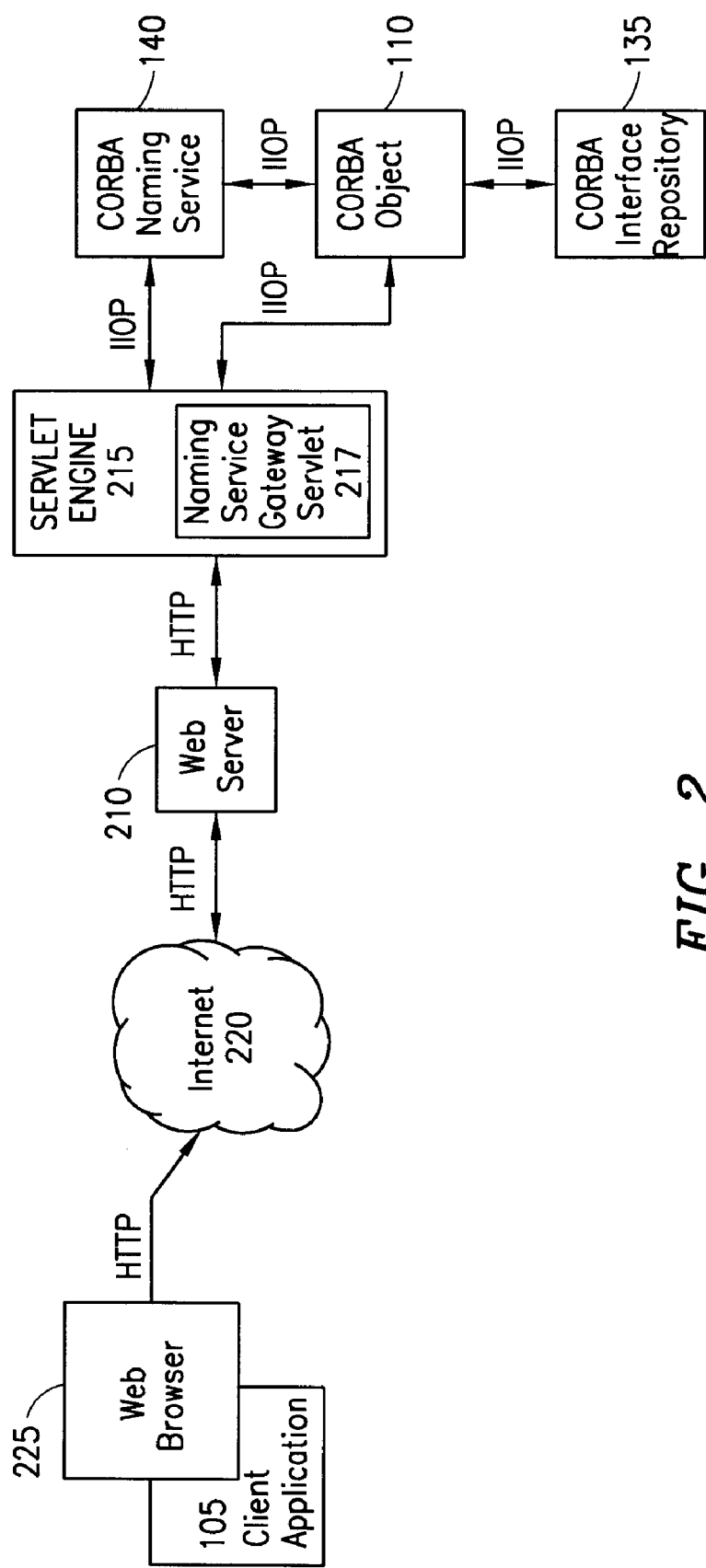
FIG. 2 is a block diagram of a distributed object system at application development time configured in accordance with the principles of the present invention.

Referring now to FIG. 2, there is illustrated a block diagram of the distributed object system 100 at development time, configured in accordance with the principles of the present invention. As shown in FIG. 2, a web server 210 and a servlet engine 215 are placed between a given CORBA object 110 and a communications medium, the Internet 220, to permit an application developer to receive the services of the CORBA object 110 using a web browser 225. It should, of course, be understood to those skilled in the art that the particular communications medium is not limited to the Internet, and can instead include, for example, an Intranet.

With further reference to FIG. 2, the servlet engine 215 runs a Naming Service Gateway Servlet 217 in a generic, application-independent environment, and controls access to the aforementioned CORBA naming service 140. The servlet engine 215 is preferably accessible over the world wide web (web) via the web server 210, simply by using a conventional Uniform Resource Locator (URL) address. Those skilled in the art will recognize that the Internet 220 uses URL addresses to locate documents and other media, including the servlet engine 215. In order for CORBA objects 110 to be accessible by the servlet engine 215, the CORBA objects 110 are preferably registered with CORBA Naming Service 140 with a root naming context. The URL of the servlet engine 215 is associated with the root naming context of the CORBA Naming Service 140.

When an application developer accesses the servlet engine 215 through the web browser 225 using the servlet engine's 215 URL, the servlet engine 215 contacts the CORBA Naming Service 140 and retrieves the elements in the root naming context using the aforedescribed IIOP protocol. The servlet engine 215 then renders these elements in the Hypertext Markup Language (HTML) format and returns the elements to the web browser 225 using the Hypertext Transmission Protocol (HTTP).

The elements that the servlet engine 215 retrieves includes subnaming contexts and references to CORBA objects. To understand the arrangement of this information in the CORBA Naming Service, a useful analogy to consider is a computer file system. In this comparison a directory and a file in a computer file system are analogous to a naming context and a CORBA Object reference in the CORBA Naming Service 140, respectively. Furthermore, a directory may contain a subdirectory in a computer file system just as a naming context may contain a subnaming context in the CORBA Naming Service 140. Finally, the root directory in a computer file system may not be contained by any other directory, just as the root naming context in the CORBA Naming Service 140 may not be contained by any other naming context.

The HTML view of the root naming context displayed by the web browser 225 shows hyperlinked CORBA Object references and hyperlinked subnaming contexts. The application developer may select a subnaming context, in a similar fashion to the root naming context, to view the elements contained by that subnaming context. It is conventional to arrange information in the CORBA Naming Service 140 in such a way that the scope of the elements contained by the root naming context is larger then the scope of the elements contained by any of its subelements. Therefore, selecting a subnaming context narrows the scope of the elements currently being viewed in the web browser 225.

This approach allows the application developer to successively "zoom in" or "drill down" through subnaming contexts until reaching a web browser 225 view showing the element for the particular CORBA Object reference of interest. Selecting the hyperlink for this CORBA Object reference then causes the servlet engine 215 to locate the associated CORBA Object reference in the CORBA Naming Service 140. This reference is then used to contact the associated CORBA Object 110 and request the appropriate IDL interface 130. This IDL interface 130 is in turn retrieved from the CORBA Interface Repository 135, as illustrated in FIGS. 1 and 2, and returned to the Naming Service Gateway Servlet 217. The Naming Service Gateway Servlet 217 then formats this information into HTML and returns it to the web browser 225 for display. The resulting web browser view 225 illustrates the services provided by the CORBA Object 110 as defined by the associated IDL interface 130. Each of these services is preferably hyperlinked in the web browser 215 view.

The application developer may browse, discover and then select a service of interest by selecting the associated hyperlink in the web browser 225 view. This causes the Naming Service Gateway Servlet 217 to generate a proxy that encapsulates all of the information required to locate the CORBA Object 110, providing the selected service, as well as invoking the selected service, including but not limited to, protocol and the signature of the selected service. For example, one possible format this proxy may take is what is known in the art as a JavaBean. The Naming Service Gateway Servlet 217 then writes the information encapsulated by this proxy to a file that is downloaded to the web browser 225 and saved as a local file by the application developer in response to selecting the service in the web browser view. This proxy stored in a local file in the previous step may be integrated into a client application 105 developed by the applications developer.

Figure 3:
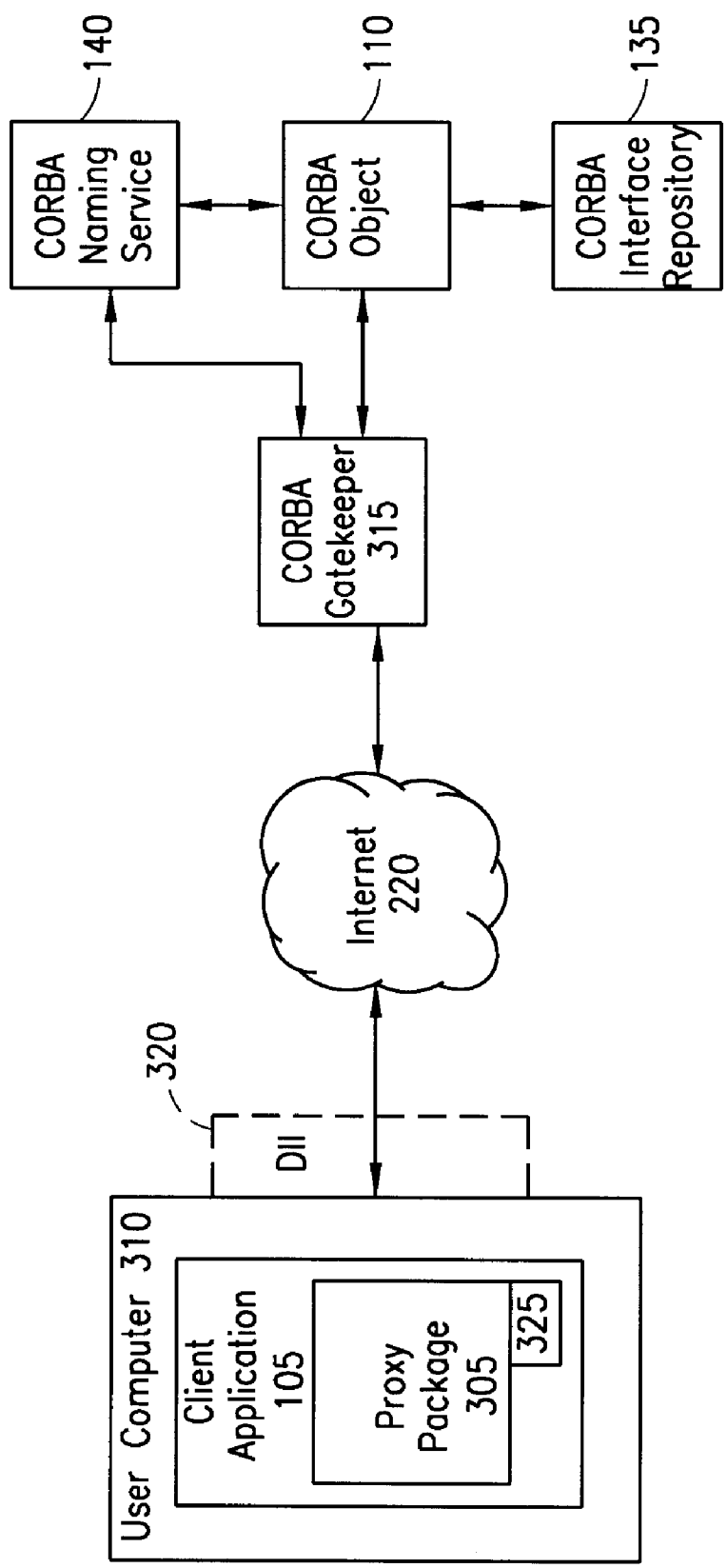
FIG. 3 is a block diagram of a distributed object system at run time configured in accordance with the principles of the present invention.

Referring now to FIG. 3, there is illustrated a block diagram of the aforementioned distributed object system 100 at run-time, configured in accordance with the present invention. The client application 105 with a proxy package 305 for a given CORBA object 110 integrated therein is installed on the user's computer 310. When the client application 105 is run, the client application 105 invokes the proxy package 305 contained therein. When the proxy package 305 is so invoked, the proxy package locates the CORBA object 110 using the CORBA Naming Service 140 via the Internet 220 and a CORBA Gatekeeper 315. The proxy package 305 then builds a request using a DII 320 for the CORBA object 110 and invokes the request. The request is propagated to the CORBA object 110 via the CORBA gatekeeper 315 using IIOP. The CORBA object 110 receives the request, operates on the request, and returns the results to the proxy package 305. The proxy package 305 then creates an event package 325 with the results of the request and makes the event package available to the client application 105. When the client application 105 receives the event package 325, the client application 105 has access to the results.

It is apparent from the above description that the goals, objectives, and visions of the distributed objects community for presenting an architecture that leverages the strengths of both web and distributed object systems have been met in the system and method of the present invention allowing the creation of web services that deliver the power of distributed object systems and CORBA, and which may be accessed and reused over the web with standard web tools requiring no CORBA expertise. Further, with the implementation of this improved architecture in JAVA, a well-established, freely available and proven technology, the system and method of the present invention is directed to these sophisticated web services that facilitate the more powerful and automated business services to come.

Although the presently preferred embodiment is directed toward systems and methods that facilitate application developers in the distributed object community to rapidly create new JAVA applets or applications, it should be understood that the principles of the present invention may be implemented in a variety of distributed object environments and architectures of JAVA is merely a current example.

As will also be recognized by those skilled in the art, the innovative concepts described in the present application can be modified and varied over a wide range of applications. For example, although the embodiments are shown in the Common Object Request Broker Architecture, the invention is not limited to such an architecture and can be practiced in other distributed computing architectures, such as Distributed Component Object Module (DCOM) produced by the Microsoft Corporation. Accordingly, the scope of the present invention should not be limited to any of the specific exemplary teachings discussed, but is only limited by the following claims.

What is claimed is:

1. A method for publishing a server object, said method comprising the steps of:
   registering the server object with a naming service associated with a servlet engine, whereby the server object is viewable on a web browser as a web service;
   loading an interface associated with the server object in an interface repository in communication with the naming service;
   publishing at least one server object;
   receiving a list of available server objects in a web browser view;
   receiving a selection of a particular server object in the web browser view;
   receiving a list of services for the selected server object in the web browser view;
   receiving a selection of a particular service of the selected server object in the web browser view;
   generating a proxy in response to receiving the selections;
   receiving the generated proxy;
   creating source code to be utilized in a client application;
   compiling the source code to form object code to be utilized in the client application; and
   integrating the proxy with the object code in developing the client application.

2. The method of claim 1, wherein the server object comprises a CORBA object, the naming service comprises a CORBA Naming Service, and the interface repository comprises a CORBA Interface Repository.

3. The method of claim 1, wherein, in said step of registering, the servlet engine is associated with a web server.

4. The method of claim 3, wherein, in said step of registering, the servlet engine is associated with a Uniform Resource Locator.

5. The method of claim 3, wherein, in said step of registering, the servlet engine communicates with the naming service and the interface repository pursuant to a first communications protocol, and communicates with the web browser via the web server pursuant to a second communications protocol.

6. The method of claim 5, wherein, in said step of registering, the servlet engine translates data formatted according to the first communications protocol into data formatted accorded to the second communications protocol.

7. A method of receiving services from a distributed object, said method comprising the steps of:
   sending a request from a user utilizing a web browser to a servlet engine, the request selecting the distributed object to be integrated into a user application being developed;
   retrieving an interface associated with the distributed object, the interface listing the services provided by that distributed object and operable to enable a user of the web browser to select a service;
   sending a request from the user utilizing the web browser to a servlet engine, the request selecting a service of the selected distributed object to be integrated into the user application being developed;
   generating a proxy associated with the user selections, by the servlet engine, for later use by the user application to access the selected server object and service;
   forwarding the proxy associated with the selected server object and service to the web browser being utilized by the user; and
   integrating the proxy into the user application.

8. The method of claim 7, further comprising the step of:
   receiving a hyperlink selection from the user.

9. The method of claim 7, wherein the step of retrieving further comprises the step of:
   locating a reference to the distributed object in a naming service.

10. The method of claim 9, wherein, in the step of locating the reference, said naming service is a CORBA Naming Service.

11. The method of claim 7, wherein the retrieving step further comprises the step of:
    retrieving the interface associated with the distributed object from a CORBA Interface Repository.

12. The method of claim 7, wherein the retrieving step further comprises the step of:
    retrieving the interface associated with the server object pursuant to an Internet Inter-Object Request Broker Protocol (IIOP).

13. The method of claim 12, wherein the forwarding step further comprises the step of:
    formatting the retrieved interface pursuant to a Hypertext Transmission Protocol.

14. The method of claim 7, wherein the sending step further comprises the step of:
    forwarding a browser view to the web browser of a naming context containing a reference to the distributed object.

15. A method of receiving a proxy later to be used to access services from a distributed object, said method comprising the steps of:
    registering the distributed object with a naming service associated with a servlet engine;
    wherein the distributed object is viewable on a web browser as a web service;
    loading an interface associated with the distributed object in an interface repository in communication with the naming service;
    sending a request from a user utilizing a web browser running on a client computer to the servlet engine, the request selecting the distributed object;
    retrieving the interface associated with the distributed object at the web browser;
    selecting, by the user, a service via the interface;
    downloading a proxy associated with the distributed object to the web browser; and
    integrating the proxy with a client application being developed by the user.

16. The method of claim 15, further comprising the step of:
    receiving a hyperlink selection from a user.

17. The method of claim 15, wherein the sending step further comprises the step of:

forwarding a browser view of a subnaming context associated with the distributed object.

18. The method of claim 15, further comprising the step of:
    generating the proxy from the interface retrieved during the retrieving step.

19. The method of claim 18, wherein the step of generating the proxy further comprises the step of:
    encapsulating the proxy into a JavaBean.

20. A method for invoking services from a distributed object, said method comprising the steps of:
    registering the distributed object with a naming service associated with a servlet engine;
    wherein the distributed object is viewable on a web browser as a web service;
    loading an interface associated with the distributed object in an interface repository in communication with the naming service;
    publishing at least one server object;
    receiving a list of available server objects in a web browser view;
    receiving a selection of a particular server object in the web browser view;
    receiving a list of services for the selected server object in the web browser view;
    receiving a selection of a particular service from the list of services;
    developing a client application operable to interact with the server object;
    downloading a proxy associated with the server object and a service it provides during said developing of the client application;
    integrating the proxy into the client application being developed;
    running the developed client application with the proxy integrated therein;
    sending a request by the proxy to the service provided by the server object; and
    receiving results responsive to the request from the service provided by the server object via the proxy.

21. The method of claim 20, wherein, in said step of downloading, said proxy is associated with a CORBA object.

22. The method of claim 20, wherein the step of sending the request further comprises the step of:
    generating a Dynamic Invocation Interface by the proxy.

23. An object services delivery system for delivering services from a distributed object, said object services delivery system comprising:
    a naming service for registering the server object;
    an interface repository for storing an interface associated with the distributed object;
    a web server for displaying at least one distributed object and receiving a user selection of a particular distributed object listing the services of the selected distributed object; and
    a servlet engine for locating a reference to the distributed object from the naming service, and for retrieving the interface associated with the distributed object from the interface repository, responsive to the user selection received at the web browser, the servlet engine including generation means for generating a proxy package, from the retrieved interface, for later use with a user application.

24. The object services delivery system of claim 23, wherein the naming service further comprises a CORBA Naming Service, and wherein the interface repository further comprises a CORBA Interface Repository.

25. The object services delivery system of claim 23, wherein the servlet engine further comprises:
    location means for locating the reference to the distributed object at the naming service; and
    retrieval means for retrieving the interface from the interface repository.

26. The object services delivery system of claim 25, wherein the servlet engine further comprises:
    format means for formatting the retrieved interface pursuant to a Hypertext Transmission Protocol.

27. The object services delivery system of claim 23, wherein the servlet engine further comprises:
    forwarding means for forwarding the proxy package to the web browser, responsive to the user selection.

28. The object services delivery system of claim 27, wherein the proxy package further comprises a JavaBean.

29. The object services delivery system of claim 23, wherein the servlet engine further comprises:
    forwarding means for forwarding to the web browser a browser view of a naming context containing a reference to the distributed object.

* * * * *